(12) United States Patent
Coers et al.

(10) Patent No.: US 6,487,836 B1
(45) Date of Patent: Dec. 3, 2002

(54) CROP MOISTURE SENSOR FOR CONTROLLING HARVESTING SPEED

(75) Inventors: Bruce Alan Coers, Hillsdale; Daniel James Burke, Cordova, both of IL (US); Jerry Dean Litke, Hillsboro; William F. Cooper, Fargo, both of ND (US); Karl-Heinz Otto Mertins, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/812,810

(22) Filed: Mar. 20, 2001

(51) Int. Cl.$^7$ .......................... A01F 12/16; A01D 75/18
(52) U.S. Cl. .......................... 56/10.2 B; 460/7
(58) Field of Search .................. 56/10.2 B, 10.2 R; 460/7

(56) References Cited

U.S. PATENT DOCUMENTS

| | | | |
|---|---|---|---|
| 3,073,099 A | 1/1963 | Andersen | 56/20 |
| 3,093,946 A | 6/1963 | Pitt et al. | 56/20 |
| 3,138,908 A | 6/1964 | Budzich | 56/20 |
| 3,481,122 A | 12/1969 | Pool et al. | 56/21 |
| 3,514,929 A | 6/1970 | Cornish et al. | 56/21 |
| 3,546,860 A | 12/1970 | Pool et al. | 56/21 |
| 4,458,471 A | 7/1984 | Herwig | 56/10.2 |
| 4,487,002 A | 12/1984 | Kruse et al. | 56/10.2 |
| 4,893,241 A | 1/1990 | Girodat et al. | 364/424.07 |
| 4,934,985 A | 6/1990 | Strubbe | 460/4 |
| 5,488,817 A | 2/1996 | Paquet et al. | 56/10.2 |
| 5,855,108 A | 1/1999 | Salz et al. | 56/10.2 |
| 6,036,597 A | 3/2000 | Arner | 460/6 |
| 6,167,337 A | * 9/2000 | Wendte et al. | |
| 6,119,531 A | * 12/2000 | Haak et al. | |
| 6,185,990 B1 | 2/2001 | Missotten et al. | 73/73 |

FOREIGN PATENT DOCUMENTS

JP  5 207 813 A2  8/1993

* cited by examiner

Primary Examiner—H. Shackelford

(57) ABSTRACT

An agricultural combine having a supporting structure that is driven by ground engaging wheels at a harvesting speed by a propulsion assembly. The combine is also provided with a threshing assembly that is supplied harvested crop material by a feederhouse. The feederhouse is provided with a moisture sensor for sensing the moisture of harvested crop material as it passes through the feederhouse. The moisture sensor produces a moisture signal that is directed to an electronic combine controller. The electronic combine controller regulates the harvesting speed of the combine in response to the moisture signal.

5 Claims, 2 Drawing Sheets

CROP MOISTURE SENSOR FOR CONTROLLING HARVESTING SPEED

BACKGROUND OF THE INVENTION

1. Field of the Invention

The present invention is directed to a combine having a crop moisture sensor that is mounted in the feederhouse of a combine for directing a moisture signal to a controller for controlling the harvesting speed of the combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A harvesting assembly located at the front of the combine harvests the crop. The harvested crop is directed to a feederhouse for delivering the harvested crop material to a threshing assembly. The threshing assembly may either be a conventional transverse threshing cylinder and concave, or a rotary threshing assembly.

Typically crop moisture sensors are used to detect the moisture of harvested grain. Capacitance crop moisture sensors have been located in the clean grain elevator, various clean grain augers or in the grain tank. In one proposed system a crop moisture sensor is mounted on a harvesting platform. Its moisture signal is used to control combine running speed, see Japanese Patent 5-20781 3A2. In another proposed embodiment the moisture sensor is mounted to the floor of a feederhouse, see U.S. Pat. No. 6,185,990.

SUMMARY

It is an object of the present invention to locate a crop moisture sensor in the feederhouse that senses the moisture of the harvested crop for controlling the operations for an agricultural combine.

An agricultural combine is provided with a throughput control system which controls the harvesting speed of the combine in response to various inputs. One of the inputs to the throughput control system is a harvested crop moisture signal that is directed to the electronic controller of the throughput control system. The moisture signal is generated by a capacitance moisture sensor that is mounted on the feederhouse. The moisture sensor comes into operational contact with the harvested crop material as it passes through the feederhouse. The moisture signal reflects the moisture content of the harvested crop before it enters the threshing assembly. The moisture signal is directed to the electronic controller and can be used to modify the desired hydraulic pressure signal or the actual pressure signal, to thereby modify the harvesting speed of the combine.

Cumulatively or alternatively the moisture signal can be used to immediately change the speed of the combine if the moisture signal falls outside certain preset limits or the moisture is dramatically changed from previous moisture readings. For example, if the combine is entering a green weedy patch in the field, the moisture sensor would signal high moisture crop material, the controller in turn would immediately slow down the combine to better accommodate this heavy load. Similarly, as the combine passes out of this weedy patch the controller would automatically speed up the combine as the combine enters more normal crop conditions. As stated above, the moisture signal can be used to simply modify one of the hydraulic pressure signals and/or be used against moisture set points to override the normal throughput control using the actual hydraulic pressure of the variable torque sensing drive.

DETAILED DESCRIPTION

Figure 1:
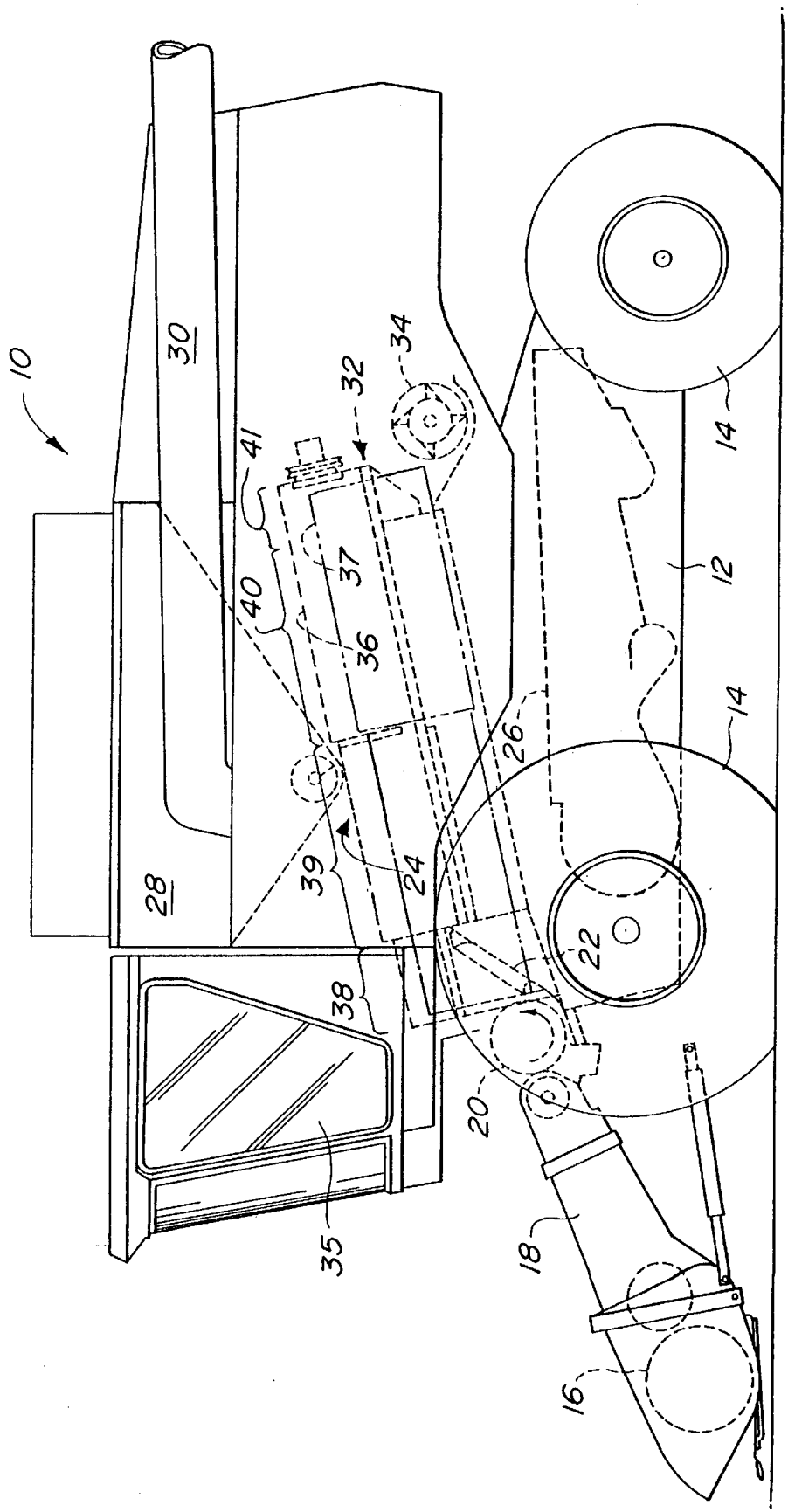
FIG. 1 is a semi-schematic side view of an agricultural combine.
Figure 2:
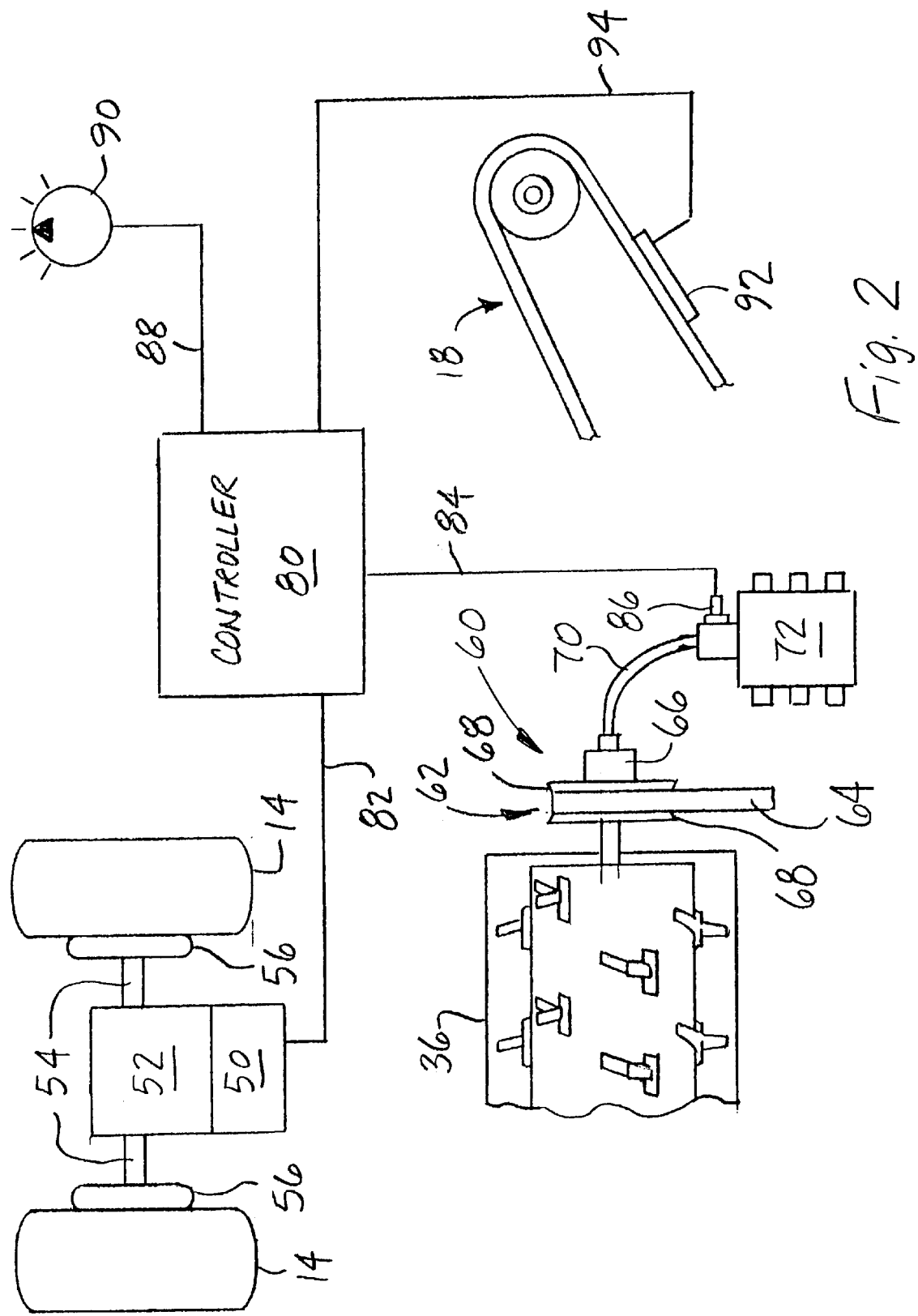
FIG. 2 is a schematic of the throughput control system of the present invention.

FIG. 1 shows an agricultural combine 10 comprising a supporting structure 12 having ground engaging wheels 14 extending from the supporting structure. Although the combine is illustrated as having wheels it could also have ground engaging tracks either full tracks or half tracks. A harvesting platform 16 is used for harvesting a crop and directing it to a feederhouse 18. The feederhouse 18 contains a conveyor for conveying the harvested crop to a beater 20. The beater 20 directs the crop upwardly through an inlet transition section 22 to a rotary threshing and separating assembly 24. The illustrated threshing and separating assembly 24 is axially arranged in the combine 10, however, it could be in other orientations relative to the longitudinal axis of the combine. Although the present invention is described and illustrated as being used on a rotary threshing and separating assembly, it can also be used on a combine having a conventional transverse threshing cylinder and concave assembly.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38. Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24.

The front wheels 14 of the combine 10 are driven by a hydrostatic transmission 50. The hydrostatic transmission 50 is driven in a conventional manner by an internal combustion engine, not shown. The hydrostatic transmission in turn drives a gear box 52. Two live axles 54 extend outwardly from the gear box 52 and drive final drives 56 of the front wheels 14. The hydrostatic transmission 50 comprises a pump unit and a motor unit. The pump unit and/or the motor unit are provided with adjustable swash plates. The adjustable swash plates control the output speed of the transmission and its direction of rotation. Solenoid control valves control the positions of the swash plates. The steerable rear wheels 14 can also be driven by wheel motors directly mounted to the wheels. The speed of the wheel motors can be controlled by the throughput control system discussed below.

A variable torque sensing drive 60 drives the rotor 37. The same internal combustion engine that drives the hydrostatic transmission drives the variable torque sensing drive 60. The drive 60 is a belt drive having a variable diameter drive sheave, not shown, and a variable diameter driven sheave 62. A belt 64 extends between the drive sheave and the driven sheave 62 for transmitting rotational power. Hydraulic cylinders control the diameters of the sheaves. The hydraulic cylinder 66 is coupled to the driven sheave 62 and moves the face plates 68 of the sheave 62 in and out to control the sheave's effective diameter relative to the belt 64. By changing the effective diameters of the sheaves the effective speed of the driven sheave 62 is changed. Pressurized hydraulic fluid is directed through hydraulic line 70 to hydraulic cylinder 66 from valve stack 72. The rotor is driven at a constant selected rotor speed by the variable diameter sheaves. The torque transmitted by the belt and sheaves varies as crop material throughput varies. Variations in throughput result in variations in loss rates. Throughput is directly related to loss rates.

An electronic controller 80 controls the harvesting speed of the combine 10. That is, the electronic controller 80 regulates the forward speed (harvesting speed) of the combine by regulating the position of the swash plates of the hydrostatic transmission by controlling the operation of the solenoid control valves though line 82. The controller 80 receives an actual hydraulic pressure signal through line 84 from hydraulic pressure sensor 86. Hydraulic pressure sensor 86 senses the hydraulic pressure in the variable torque sensing drive 60. This actual hydraulic pressure signal corresponds to a crop throughput signal indicating the crop throughput in the rotary threshing and separating assembly 24. As such, the hydraulic pressure sensor 86 acts as a crop throughput sensor. The controller 80 also receives a desired loss rate signal through line 88 from switch 90. Switch 90 is located in the operator's cab 35.

In operating the throughput control system the operator selects a desired loss rate on switch 90. The controller 80 receives this loss rate signal and converts it into a desired hydraulic pressure signal. The controller 80 also receives the actual pressure signal from the sensor 86. The controller 80 regulates the forward speed of the combine so that the desired hydraulic pressure signal is equal to the actual pressure signal.

As a further refinement to the system, the feederhouse 18 is provided with a capacitance moisture sensor 92 that is in communication with the controller 80 through line 94. The moisture sensor 92 senses moisture in the harvested crop passing through the feederhouse. The moisture signal can be used to modify the actual pressure signal or the desired pressure signal to slow the combine as it encounters high moisture harvested crop.

Together with the signal modification, discussed above, or as an alternative to the signal modification, the moisture sensor signal may be used to directly regulate the harvesting speed of the agricultural combine. If the crop moisture level of the harvested crop is greater than a specified amount, the combine will be slowed by a specified amount. For example, if the combine encounters a weedy green crop material the moisture sensor 92 will sense increased moisture. The moisture signal will be directed through line 94 to controller 80. The controller 80 receiving this signal will first determine if the crop moisture has increased above a specified amount, and if it has the controller will immediately slow down the combine.

The present invention should not be limited by the above-described embodiments, but should be limited solely by the claims that follow.

We claim:

1. An agricultural combine for harvesting, threshing and separating an agricultural crop, the agricultural combine comprising:

a supporting structure;

ground engaging means for propelling the supporting structure at a harvesting speed;

a threshing assembly being mounted to the supporting structure;

a feederhouse for receiving harvested crop material and transporting harvested crop material to the threshing assembly;

a moisture sensor for sensing the moisture in harvested crop as it passes through the feederhouse, the moisture sensor providing a moisture signal;

a controller for adjusting the harvesting speed of the ground engaging means, the moisture signal being received by the controller; wherein the controller uses the moisture signal to adjust the harvesting speed of the ground engaging means.

2. An agricultural combine as defined by claim 1 further comprising a crop throughput sensor that directs a crop throughput signal to the controller for controlling the harvesting speed of the combine.

3. An agricultural combine as defined by claim 2 wherein the moisture signal modifies the crop throughput signal.

4. An agricultural combine as defined by claim 3 wherein the crop moisture signal overrides the crop throughput signal in controlling the harvesting speed of the combine if the moisture signal has increased above a specified amount.

5. An agricultural combine as defined by claim 2 wherein the crop moisture signal overrides the crop throughput signal in controlling the harvesting speed of the combine if the moisture signal has increased above a specified amount.

* * * * *